UNITED STATES PATENT OFFICE.

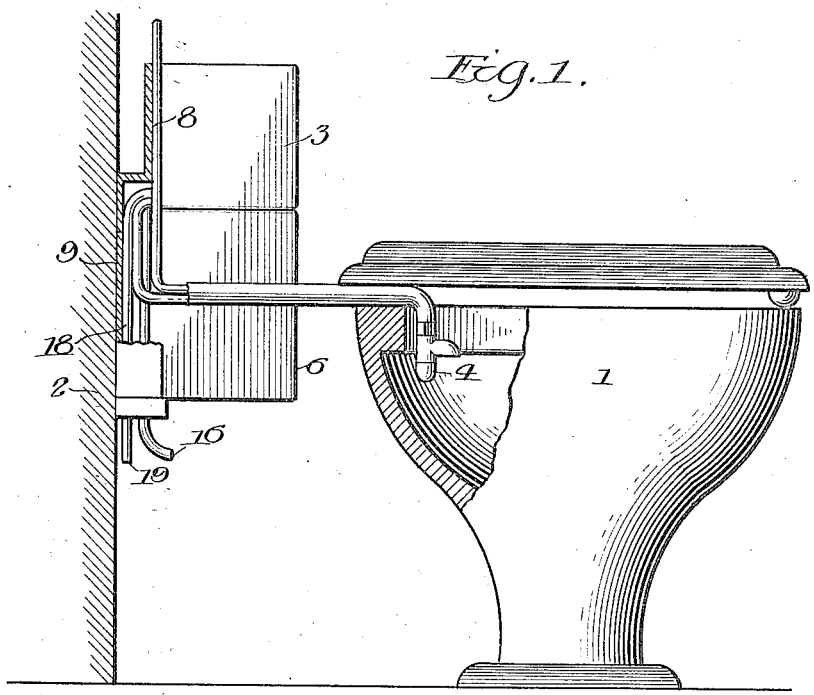
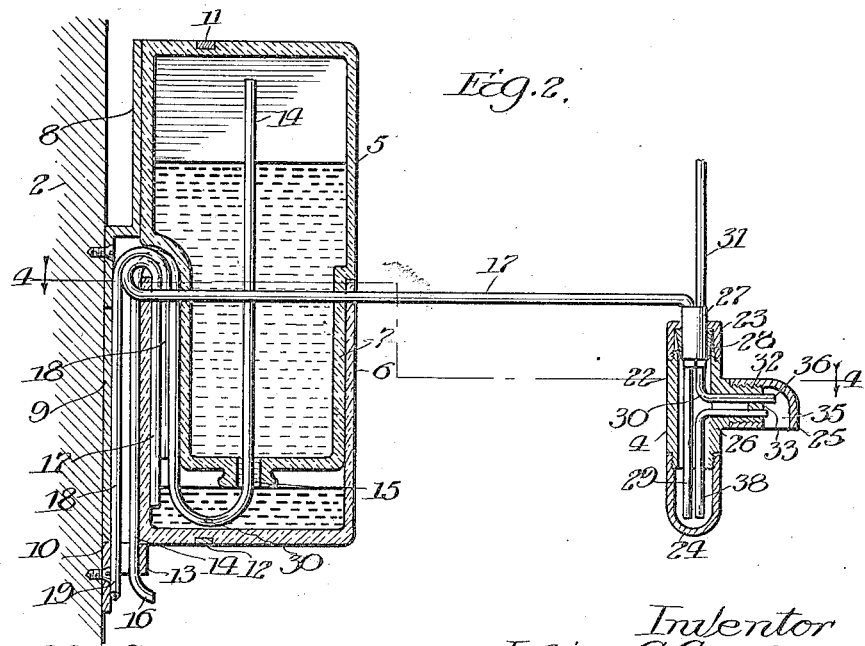

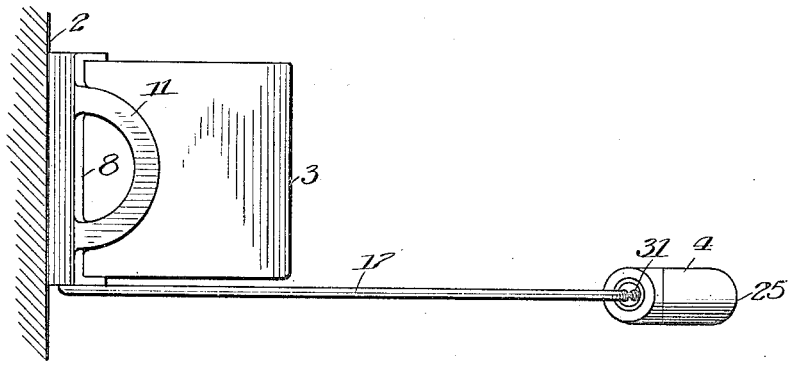
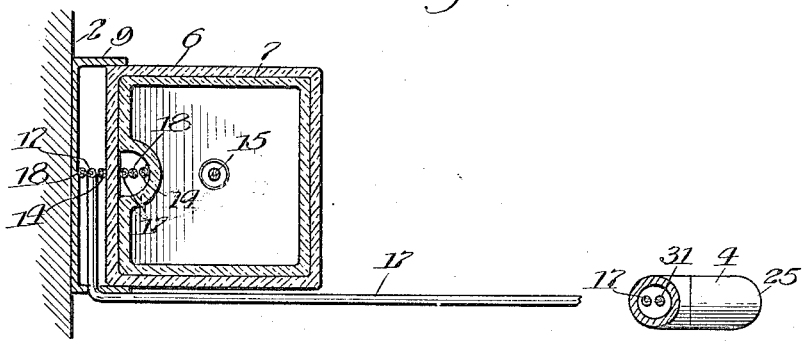

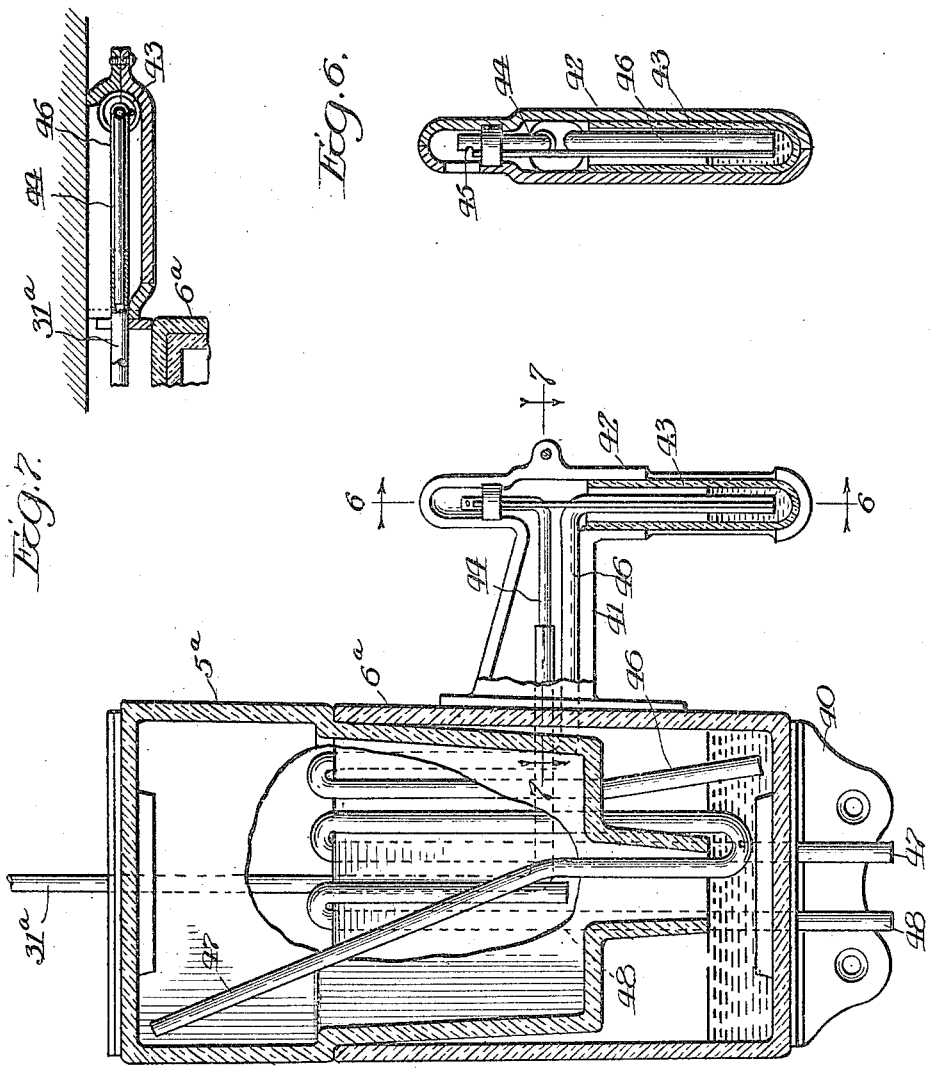

JULIAN G. GOODHUE, OF CHICAGO, ILLINOIS.

SPRAYING OR LIKE APPARATUS.

1,293,407.  Specification of Letters Patent.  Patented Feb. 4, 1919.

Application filed October 30, 1912, Serial No. 728,740. Renewed June 29, 1918. Serial No. 242,669.

*To all whom it may concern:*

Be it known that I, JULIAN G. GOODHUE, a citizen of the United States, residing at Chicago, in the county of Cook and State of Illinois, have invented a certain new and useful Improvement in Spraying or like Apparatus, of which the following is a full, clear, concise, and exact description, reference being had to the accompanying drawings, forming a part of this specification.

My invention relates to spraying or like apparatus, that is to say apparatus by which material such as liquid may be sprayed or ejected, or otherwise distributed.

Prominent objects of the invention are to provide a simple, practical and effective apparatus of this class, to simplify the same and reduce its number of parts and the cost of construction, installation and repair, to provide for the convenient arrangement of the apparatus in connection with the devices with which it is to be used, to arrange for the ample supply of the substance to be sprayed or distributed, and to secure the foregoing and other desirable results in a simple and expeditious manner.

Part of the matter disclosed in this application was disclosed in my former application, Serial No. 545,390, filed February 23, 1910, for disinfectant apparatus, and was withdrawn from that application and is claimed herein because of a requirement for division in said other application.

In the accompanying drawings, Figure 1 is a view partly in elevation and partly in section, of a lavatory bowl and an apparatus for disinfecting the same, embodying my invention;

Fig. 2 is a view largely in vertical section of said apparatus;

Fig. 3 is a plan view of the apparatus as shown in Fig. 2;

Fig. 4 is a horizontal section taken on line 4—4 of Fig. 2;

Fig. 5 is a vertical section of a modified form of disinfecting apparatus;

Fig. 6 is a cross section taken on line 6—6 of Fig. 5;

Fig. 7 is a horizontal section taken on lines 7—7 in Fig. 5.

Referring to the drawings, a lavatory bowl 1 is shown mounted or arranged in the usual way, and the apparatus for disinfecting the same is shown mounted upon a wall 2, adjacent to said bowl 1. The disinfecting apparatus comprises a reservoir and feeding device 3, secured to and supported by the wall 2, and a spraying or nozzle device 4 located within the bowl 1, and suitably mounted to hold it in that position.

The reservoir and feed apparatus comprises upper and lower receptacles 5 and 6 respectively, whereof the upper receptacle 5 has a contracted or reduced lower portion 7, which fits within the lower receptacle 6, said receptacles 5 and 6 being preferably made of glass, porcelain, or similar material. These receptacles are supported by bracket members 8, 9 and 10, secured to the wall 2. The upper bracket member 8 has a semi-circular portion 11, fitting into a corresponding groove in the top of the upper receptacle 5, and the lower bracket member 10 has a similar semi-circular device or portion 12, fitting into the corresponding groove in the bottom of the receptacle 6. The lower member 10 also has a strap device 13. A pipe 14 is arranged within the upper receptacle 5 and extended nearly to the top of the same, and thence downwardly through the orifice 15 of said receptacle 5, and thence upwardly on the outside of the neck 7 thereof, and then downwardly, terminating in an end 16. Another pipe 17 is arranged within the lower portion of the lower receptacle 6, extending upwardly from near the bottom of the same out over the top of the receptacle 6, and thence in a more or less horizontal direction to the spraying or nozzle device 4. A third pipe 18 is arranged within the lower receptacle 6, extending upwardly from the same and thence outwardly and downwardly, terminating at an end 19. The nozzle device 4 is suspended within the bowl 1 by the pipes to which it is connected. These connecting pipes may be connected as shown in either Fig. 1 or Fig. 2. In Fig. 1 the tube for supplying air to the nozzle device is brought alongside of the tube 17, and both are inclosed within an outer tube or casing, to which the nozzle device is attached. In the arrangement shown in Fig. 2, however, the air tube 31 and the liquid tube 17 are separated close to the nozzle device, so that the inclosing casing is reduced to a short length such as is hereafter referred to as element 27. In either case, however, the nozzle device is attached directly to an element such as 27, which in turn is supported by the tubes for supplying air and liquid to the nozzle device.

Liquid is provided in both the upper and lower receptacles 5 and 6, filling the lower one to the height of the mouth or orifice thereof, as shown in the drawings. This level is always maintained in the receptacle 6, of course, because of the action of the liquid in descending from the receptacle 5 according as it is withdrawn from the receptacle 6. The tube 14 is provided with a small aperture 20 at its bend in the receptacle 6. This reservoir apparatus is made the subject of another divisional application, divided out of said application, Serial No. 545,390, and filed February 7, 1911.

The spraying or nozzle apparatus 4 comprises a vertically disposed hollow or tubular body structure conveniently formed of a central body portion 22, having a screw threaded cap 23 at its top, and a screw threaded cup or reservoir 24, at its bottom, and a screw threaded nozzle 25 attached to a projecting portion on the side of said member 22. The cap 23 receives a tubular member 27 which is conveniently held in place by a wedge shaped collar 28 and this member 27 incloses pipes 29 and 30 whereof the pipe 29 is a bent end portion of the pipe 17 extending over from the reservoir apparatus, and the pipe 30 is an end portion of a pipe 31 which is understood to extend to some apparatus for supplying a jet or stream of air under pressure, such for example as a pump or pneumatic door check, or something of the sort. The pipe 29 extends well down toward the bottom of the reservoir cup 24, and the pipe 30 is bent so as to form a horizontal section 32, which extends through the end 33 of the nozzle projection 26, and out into the nozzle orifice 35, being provided at or near its end with a jet opening 36. Another pipe 38 is extended from the reservoir cup 24 upwardly and thence to one side out through the end piece 33 into the nozzle orifice 36 in the pipe 32. Liquid to be sprayed or distributed is introduced into the cup 24. The level of the liquid in the cup 24 is the level of the liquid in the lower receptacle 6 of the reservoir apparatus, it being seen that the pipe 17 serves as a siphon to supply the spraying apparatus 4 automatically and continuously with liquid from the reservoir apparatus by such siphon arrangement, so that as liquid is withdrawn or sprayed out, or distributed from the spraying or nozzle apparatus, such liquid is automatically replaced from the reservoir aparatus.

The pipe 31 by receiving a jet or quantity of compressed air causes the same to pass out the opening 36 and across the end of the pipe 38, thereby inducing an upward withdrawal of some of the liquid in the cup 24 and spraying or distributing said liquid out through the nozzle 35. Thus an actuation of the pumping or other mechanism connected with the pipe 31, or otherwise inducing air under pressure to pass through said pipe and out of the orifice 36 thereof, will cause a spraying or distributing operation of the liquid in the chamber or reservoir 24. This liquid and that continually supplied the nozzle device 4 from the reservoir apparatus 3, may be of a disinfecting variety so that the operation of the apparatus will produce a proper or desired distribution of disinfecting liquid.

This nozzle apparatus 4 is also divided out of said application #545,390, and made the subject of still another divisional application Patent No. 1,059,293, issued April 15, 1915.

The reservoir apparatus 3 is understood to be filled or charged from time to time in some suitable way. In said application, Serial No. 545,390, I have shown a specially constructed pumping apparatus capable of accomplishing this result, and this pumping apparatus, together with a modification thereof, are claimed in another application of mine, filed February 23, 1910, Serial No. 545,393.

In Figs. 5 and 6 I have shown a modified form of apparatus which is intended to be used in any open room or hall, or other desirable place, and not necessarily in connection with a lavatory bowl. This apparatus therefore is shown without any relation or connection, or association with such lavatory bowl, but alone by itself with its atomizer arranged so as to spray liquid into the open air or any desired place or space. This modified arrangement comprises receptacles 5ª and 6ª, very similar to the receptacles 5 and 6 of the previously described apparatus, said receptacles 5ª and 6ª being preferably made of glass, porcelain, or other similar material. These receptacles are mounted upon a bracket and frame 40 which is made the subject matter of a separate application filed by me February 7, 1913, Serial No. 746,737, Case 21. A side projecting bracket 41 is attached to one side of the supporting frame 40, said bracket 41 being both a bracket for attachment to the frame 40 and also an atomizer, said bracket being made the subject of a separate application for patent filed by me February 7, 1913, Serial No. 746,738, Case 22. The bracket 41 has its right hand side made in vertical tubular structure 42 to form an atomizer. Within this tubular structure is a separate and detachable or removable glass tube 43 adapted to form a reservoir for the disinfecting liquid of the atomizer. This tube 43 is preferably made of glass or some similar material, being thereby non-corrodible. This glass reservoir 43 fits removably in the bottom portion of the tubular structure 42 which is preferably made of metal, as is the frame 40 to which it is attached. An air blast pipe 31ª is led from the air current inducing apparatus to the disinfecting apparatus and into the bracket 41 where it joins a small pipe 44 which extends upwardly into the upper part of the tubular structure 42 and is provided with a discharge orifice 45. Another pipe 46 extends from the lower part of the reservoir 43 upward and through the bracket 41 and into the lower portion of the outer receptacle 6ª, this pipe 46 forming a siphon by which the liquid or disinfectant is drawn from the large reservoir 6ª into the small atomizer reservoir 43, so as to keep the atomizer always supplied with liquid. Another pipe 47 extends downwardly from the upper part of the inner reservoir 5ª to the outer reservoir, and thence out of the latter whence connection can be made to it for exhausting the air from the interior of the receptacle 5ª in accordance with the principle of operating my invention as hereinbefore set forth. Still another pipe 48 is extended from the interior of the receptacle 5ª out of the same, and to the exterior of the apparatus to be connected with a pump or other filling apparatus to fill the receptacles with liquid disinfectant.

It will be seen that by using a siphon connection between the atomizer reservoir and the large reservoir formed by the receptacles 5 and 6, and 5ª and 6ª, I am enabled to provide an effective and satisfactory connection between the reservoirs by which liquid is always maintained in the small reservoir of the atomizer. This connection can be readily made even though one or both of the reservoirs is made of glass, porcelain, or other similar material with which it is difficult, if not impossible to make a satisfactory pipe connection. For example, in the apparatus of Figs. 1 to 4, inclusive, the large reservoir comprising the receptacles 5 and 6 is made of glass or porcelain, or some similar material, and in the modified form of Figs. 5, 6 and 7, both reservoirs, that is the large reservoir comprising the receptacles 5ª and 6ª, and the small atomizer reservoir 43, are made of such material. In each case it will be seen the siphon connection can be easily and readily made and gives entire satisfaction, whereas it would be difficult, if not in fact impossible, to make or provide a different form of connection, as for example one involving a joint between a pipe or tube and a glass or porcelain bottle, jar, or tube. Thus the siphon connection is practical, effective and highly advantageous, and perhaps the only form of practical connection that could be employed in such an arrangement.

Inasmuch as the particular construction of bracket 41 and atomizer 42 is specifically set forth and claimed in my said other application Serial No. 746,738, filed Feb. 7, 1913, I am not claiming the same in detail here, but only in combination with the large reservoir.

It will be understood that changes and modifications can be made without departing from the spirit of the invention.

What I claim is:

1. The combination with a lavatory bowl, of a distributing device arranged within the bowl and having a reservoir, a second reservoir outside of the bowl, and a siphon connection between the second reservoir and the distribluting device, said connection being extended over the upper edge of the bowl and thence down into the bowl, the distributing device being located below the top of the bowl.

2. The combination of a spraying device having a reservoir and arranged within a lavatory bowl, of a reservoir apparatus arranged outside of said bowl and having a connection with the spraying device for supplying the latter.

3. An apparatus of the class specified, comprising a lavatory bowl, a distributing device arranged within the bowl and having a reservoir, a second or supplemental reservoir outside of the bowl, and a siphon connection extending from the supplemental reservoir to the reservoir of the distributing device in the bowl, said distributing device being mounted within the bowl below its top and the supplemental reservoir being provided with means for maintaining a uniform liquid level and being mounted with its lower end on substantially the level of the liquid reservoir whereby the siphon connection maintains a uniform level in the distributing device reservoir.

4. The combination of a nozzle device arranged within a lavatory bowl, said device having a reservoir, reservoir apparatus for supplying liquid to the reservoir of said nozzle device, and a pipe extending between the reservoir apparatus and nozzle device and resting upon the lavatory bowl to act as a support for said nozzle device.

5. In a device of the class described, in combination, a bowl, a reservoir outside of the bowl, an atomizing device within said bowl, pipe connections between said reservoir and said device, an inclosure for said connections and means for attaching said device to said inclosure.

6. The combination of a lavatory bowl, a wall near said bowl, reservoir apparatus comprising upper and lower vessels combined with means for mounting said vessels upon said wall near said bowl, a spraying device located in the bowl and below the top thereof, said spraying device having a small reservoir, and a tubular connection between one of said vessels and said spraying device, said tubular connection extending upwardly from the liquid in one of said vessels, thence horizontally over the top of a side portion of said bowl, and thence downwardly into the reservoir of said spraying device.

7. The combination of a lavatory bowl, a wall located near said bowl, a reservoir apparatus comprising upper and lower vessels, whereof the upper one feeds into and maintains a uniform liquid level in the lower one, means for mounting said jars upon said wall near said bowl, a spraying device located within said bowl and below the top thereof, said spraying device having a small liquid reservoir, and a tubular connection between said reservoir apparatus and spraying device, said connection extending upwardly from the liquid in said lower jar or vessel, and thence horizontally over the top of a side portion of said bowl, and thence downwardly to the liquid in the reservoir of said spraying device.

8. The combination of a spraying device having a small reservoir, a reservoir apparatus of relatively large size for supplying the reservoir of said spraying device, and a tubular connection between said spraying device and reservoir apparatus, said tubular connection having one of its ends inserted into the liquid of the reservoir apparatus and being extended thence upwardly and thence horizontally and thence downwardly, and its other end being inserted in the liquid of the reservoir of said spraying apparatus.

In witness whereof, I hereunto subscribe my name this 22nd day of October, A. D. 1912.

JULIAN G. GOODHUE.

Witnesses:
A. LYDA JONES,
HAZEL A. JONES.

Copies of this patent may be obtained for five cents each, by addressing the "Commissioner of Patents, Washington, D. C."